(12) United States Patent  (10) Patent No.: US 8,496,070 B2
Kollath  (45) Date of Patent: Jul. 30, 2013

(54) FOLDING HITCH LIFT ARM

(75) Inventor: Michael Dean Kollath, Reinbeck, IA (US)

(73) Assignee: Deere & Company, Moline, IL (US)

( * ) Notice: Subject to any disclaimer, the term of this patent is extended or adjusted under 35 U.S.C. 154(b) by 414 days.

(21) Appl. No.: 12/885,668

(22) Filed: Sep. 20, 2010

(65) Prior Publication Data

US 2012/0068438 A1    Mar. 22, 2012

(51) Int. Cl.
*A01B 59/04* (2006.01)

(52) U.S. Cl.
USPC .......................... 172/448; 172/680

(58) Field of Classification Search
USPC ............... 172/439, 448, 683, 810, 677, 679, 172/680, 446; 180/53.3; 280/490.1, 491.5, 280/186, 416.2
See application file for complete search history.

(56) References Cited

U.S. PATENT DOCUMENTS

| 2,734,438 | A | * | 2/1956 | Todd | 172/272 |
|---|---|---|---|---|---|
| 3,065,977 | A | * | 11/1962 | Richardson | 172/439 |
| 4,009,890 | A | * | 3/1977 | Kawakita et al. | 280/467 |
| 4,062,560 | A | * | 12/1977 | Mueller et al. | 172/272 |
| 4,715,610 | A | * | 12/1987 | Wisdom | 280/490.1 |
| 4,715,770 | A | * | 12/1987 | Kryscyk | 414/680 |
| 6,062,321 | A | * | 5/2000 | Defrancq | 172/448 |
| 7,850,192 | B2 | * | 12/2010 | Ceccarelli et al. | 280/478.1 |
| 2003/0052472 | A1 | * | 3/2003 | Moss et al. | 280/415.1 |

OTHER PUBLICATIONS

Deere & Company, Exhibit 1, Image of front hitch used on John Deere 8030 tractors, 1 page, date unknown.
Massey Ferguson, Exhibit 2, Image of front hitch used on Massey Ferguson 8600 tractors, 1 page, date unknown.
Laforge, Exhibit 3, Images of various Laforge Greenlink hitches, 4 pages, date unknown.
Zuidberg, Exhibit 4, Images of various Zuidberg front hitches, 3 pages, date unknown.
Dagenhart, Exhibit 5, Image of Dagenhart hitch, 1 page, date unknown.
Sauter, Exhibit 6, image of Sauter hitch on a Deutz tractor, 1 page, date unknown.

* cited by examiner

*Primary Examiner* — Matthew D Troutman

(57) ABSTRACT

A lift arm assembly is provided for a hitch having a hitch frame adapted to be mounted to a vehicle. The lift arm assembly includes a first arm pivotally coupled to the frame and having a having a pivot bore therein. A second arm is adapted for coupling to an implement and has a pivot pin which is rotatably and slidably received by the pivot bore. The second arm is slidable with respect to the first arm from an inboard position to an outboard position. When the second arm is in its outboard position, the second arm is pivotal about the pivot pin from a lowered position to a raised position.

7 Claims, 6 Drawing Sheets

FOLDING HITCH LIFT ARM

FIELD OF THE INVENTION

The present invention relates to a lift arm for a hitch, such as a three-point hitch.

BACKGROUND OF THE INVENTION

Three-point hitches are offered on most row crop and utility tractors. The front hitch is used to lift and carry various implements as well as ballast weights. When such a hitch is no in use, it is often desirable to be able to fold or otherwise retract the lift arms to reduce the overall length of the tractor. Currently, there are a variety of designs to allow the arms to be folded or stored.

In a typical known design, each the lift arm includes two parts or pieces. The first piece pivots on the tractor frame and is rotated up and down by the lifting hydraulic cylinders. The second piece is pinned to the first piece so that it can be rotated about a single generally horizontal pin to change the angle between the first and second pieces. In this manner, with the hitch in the raised position, the second piece of the lift arm can be folded rearward to a more vertical orientation to shorten the overall tractor length. Usually a second pin and different holes in one piece or the other allows the second piece of the arm to be locked in either the working or folded positions. Such an arrangement is currently used on some production John Deere tractors.

In some designs of this type, the pivot pin between the first and second parts of the lift arm is angled so that the outer end of the second part of the lift arm moves inboard or outboard as it is moved into the storage position. Typically, this is done to allow them to swing inboard, as is the case on the John Deere 5000 series tractor. This design can be advantageous when the tractor chassis is narrower than the spread of the hitch arms when in their working range. Alternately, an arm that swings outboard as it is moved into a storage position may be useful if the frame or other parts of the machine limit the distance an arm could be folded in a plane parallel to the tractor centerline.

In another hitch design used on Massey Ferguson 8600 series tractors, the two pieces of the lift arm both pivot about a common axis on the tractor frame. Again, the first piece is attached to the hydraulic lift cylinders to be rotated up and down. The second piece can be pinned to the first piece in two different orientations, one for and one for storage. The storage pin placement allows the normal hydraulic cylinder travel to rotate the second arm more than is desired for the working range of the hitch, which rotates it up and rearward, closer to the front of the tractor.

In some of the designs, the arms are moved into a folded storage position wherein the spacing between the implement ends of the arms is the same as the spacing in the working position. In such designs, it is possible to attach some implements to the hitch with the arms still in their folded position because they will still lower far enough to hook up. However, when the hitch is then raised, the now incorrect hitch geometry can cause the implement to lift too far, or may bind up the linkage, possibly damaging the tractor, hitch, or implement.

SUMMARY

Accordingly, an object of this invention is to provide a folding two piece hitch lift arm assembly for a hitch which has a frame which has a width similar to the spacing between the lift arms in their working position.

Another object of the invention is to provide such a lift arm assembly wherein the lift arms cannot be coupled to an implement when they are in their folded position.

These and other objects are achieved by the present invention, Wherein a front hitch includes a lift arm assembly which includes first and second arms. The first arm pivots about a pin on the hitch frame, and is rotated by a hydraulic lift cylinder. The second, forward arm attaches to the first portion via a pivot pin that can be allowed to slide axially as well as rotate. In the normal working position, the second arm is installed fully, so that it fully seats the pivot pin into the first arm, but also engages a second or load pin on the first arm so that rotation is prevented between the two arms. Instead of the load pin, other features of the two arms, such as a cast boss or ledge to take shear load could be used to prevent rotation when in working position. A retaining pin is then inserted to stop the pivot pin, and thusly the second arm, from sliding axially and disengaging the load pin. When it is desired to pivot the second arm into a storage position, the retaining pin is removed. The second arm is then slid outboard, disengaging the load pin and allowing rotation of the second arm. Sliding the second arm laterally also moves it to a position that is wider than the hitch frame, allowing it to be rotated to a storage position that is alongside the frame, rather than in front of it. The retaining pin is then reinstalled, this time engaging a different hole in the second arm's pivot pin, stopping both axial and rotational motion again, locking the second arm in the stored or folded position.

Thus, with this assembly, the lift arms may be folded for storage despite a wide hitch frame. Also, when the lift arms are folded, the ends of the lift arms are too far apart to be coupled to an implement. This avoids accidentally attaching an implement with the arms in the storage position, which can cause damage to the hitch, implement, or tractor.

DESCRIPTION OF THE PREFERRED EMBODIMENT

Figure 1:
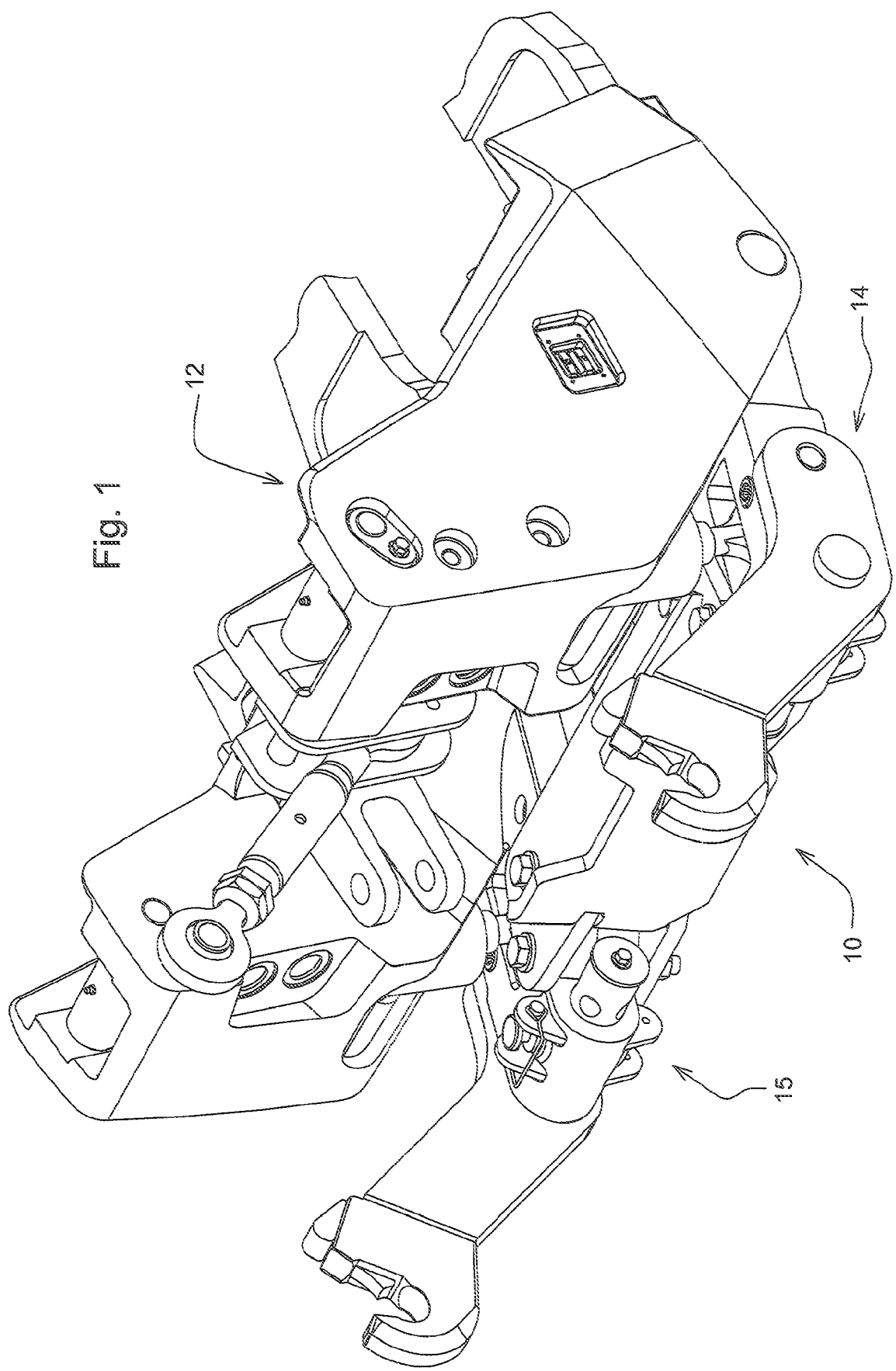
FIG. 1 is a perspective view of a hitch assembly embodying the invention.

Referring to FIG. 1, a hitch 10 includes a hitch frame 12 adapted to be mounted to the front of a vehicle (not shown) such as an agricultural or utility tractor. The hitch 10 also includes a left lift arm assembly 14 and a right lift arm assembly 15, which are symmetrical to each other about a central fore-and-aft plane.

Figure 2:
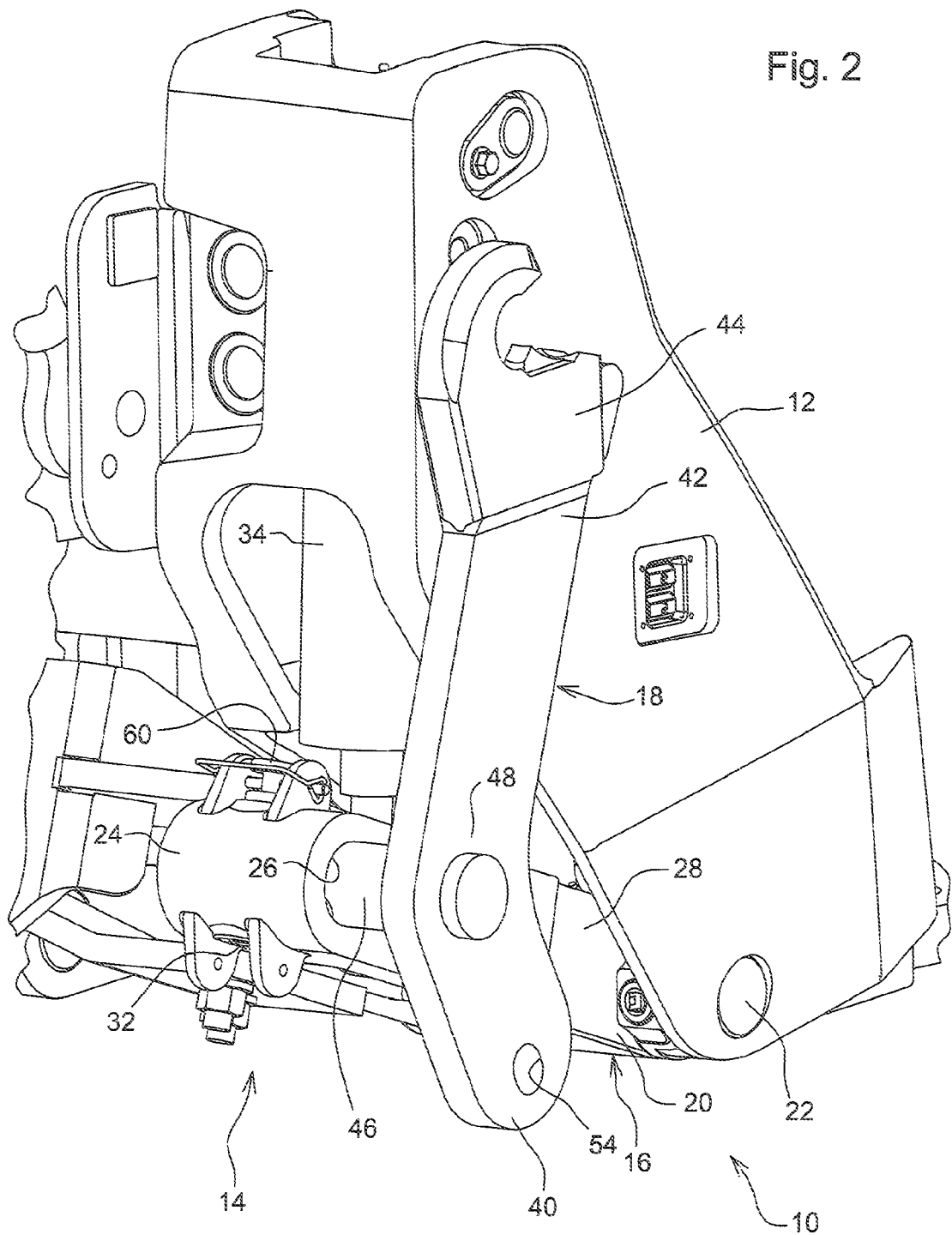
FIG. 2 is a perspective view of the left side of the hitch assembly of FIG. 1 showing the lift arm in a folded position.
Figure 3:
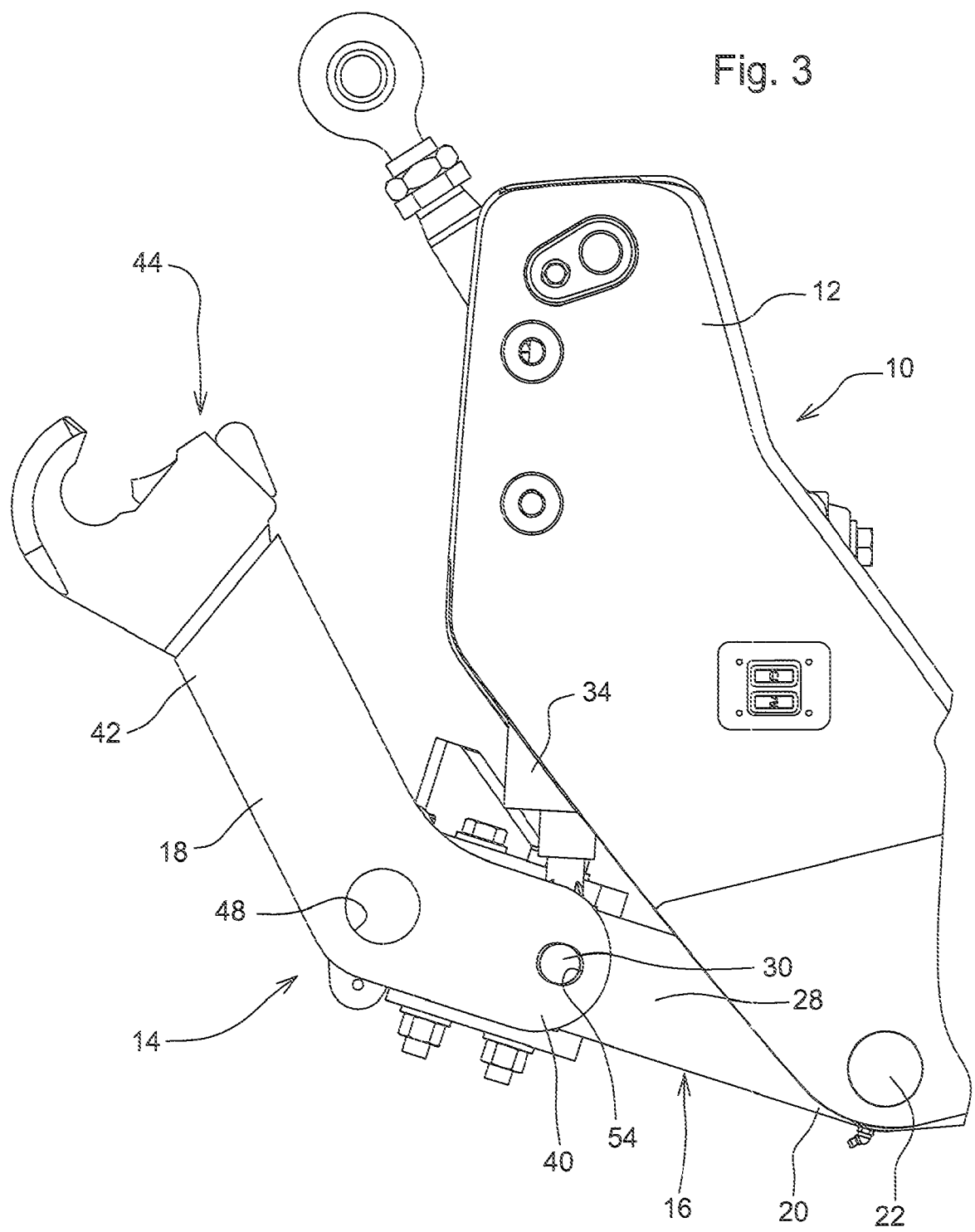
FIG. 3 is a side view of the hitch assembly of FIG. 1.
Figure 4:
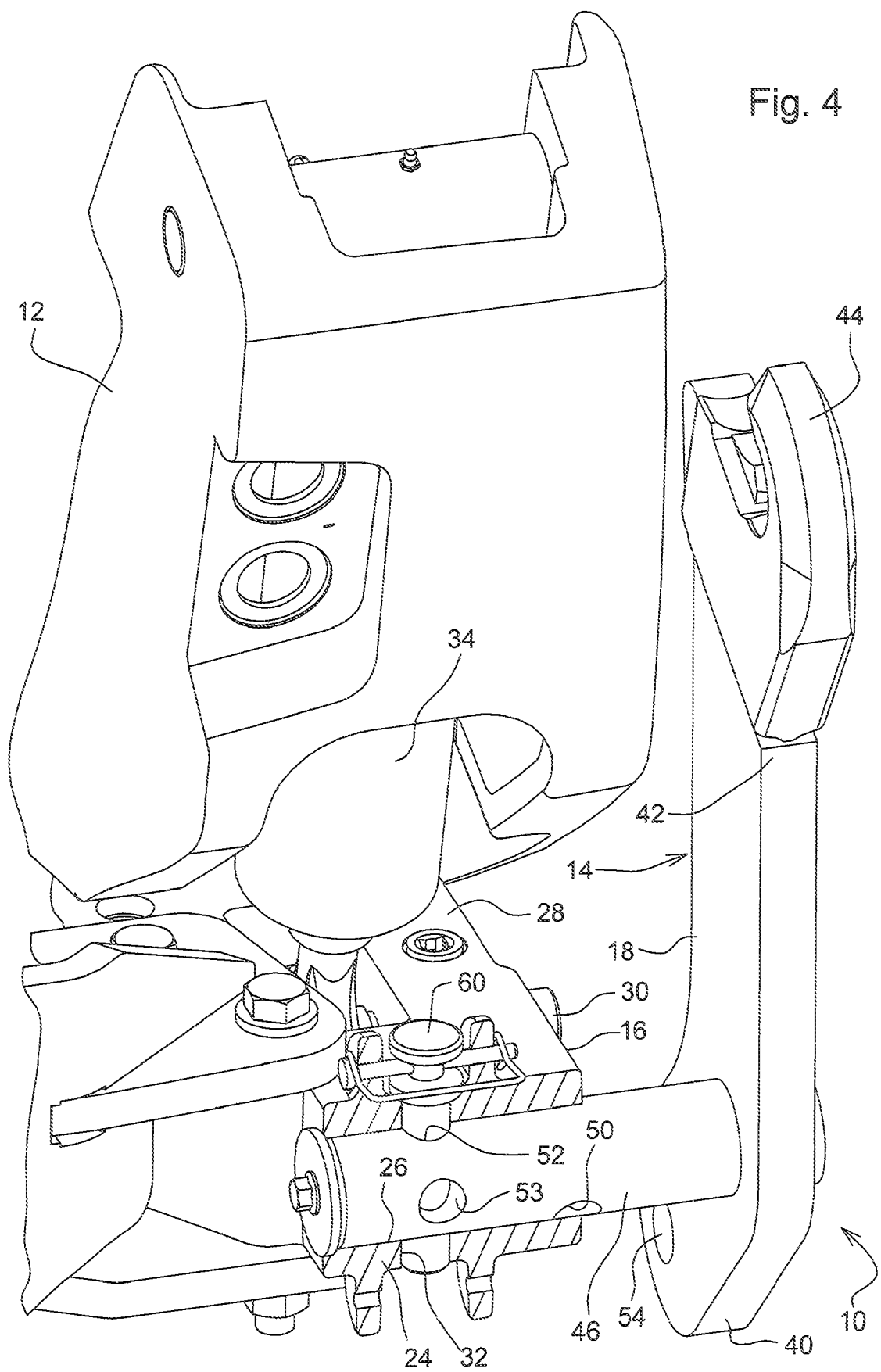
FIG. 4 is a perspective partially sectional view of the left side of the hitch assembly of FIG. 1 showing the lift arm assembly in its outboard folded position.

Referring now to FIGS. 2, 3 and 4, the lift arm assembly 14 includes a first arm 16 and a second arm 18. The first arm 16 has a first end 20 pivotally coupled to the frame 12 on pivot pin 22, and extends generally forwardly to a second end 24. The first arm 16 has a generally rectangular shape which is longest in its fore-and-aft dimension, and is preferably wider in the lateral direction and is thinner in the vertical direction.

The second end 24 has a pivot bore 26 extending laterally thereinto, and a mid portion 28 of the first arm 16 has a load pin 30 projecting laterally outwardly therefrom. A cross bore or retainer bore 32 extends through the second end 24 and intersects with the pivot bore 26. The first arm 16 is raised and lowered by a conventional lift cylinder 34.

Figure 5:
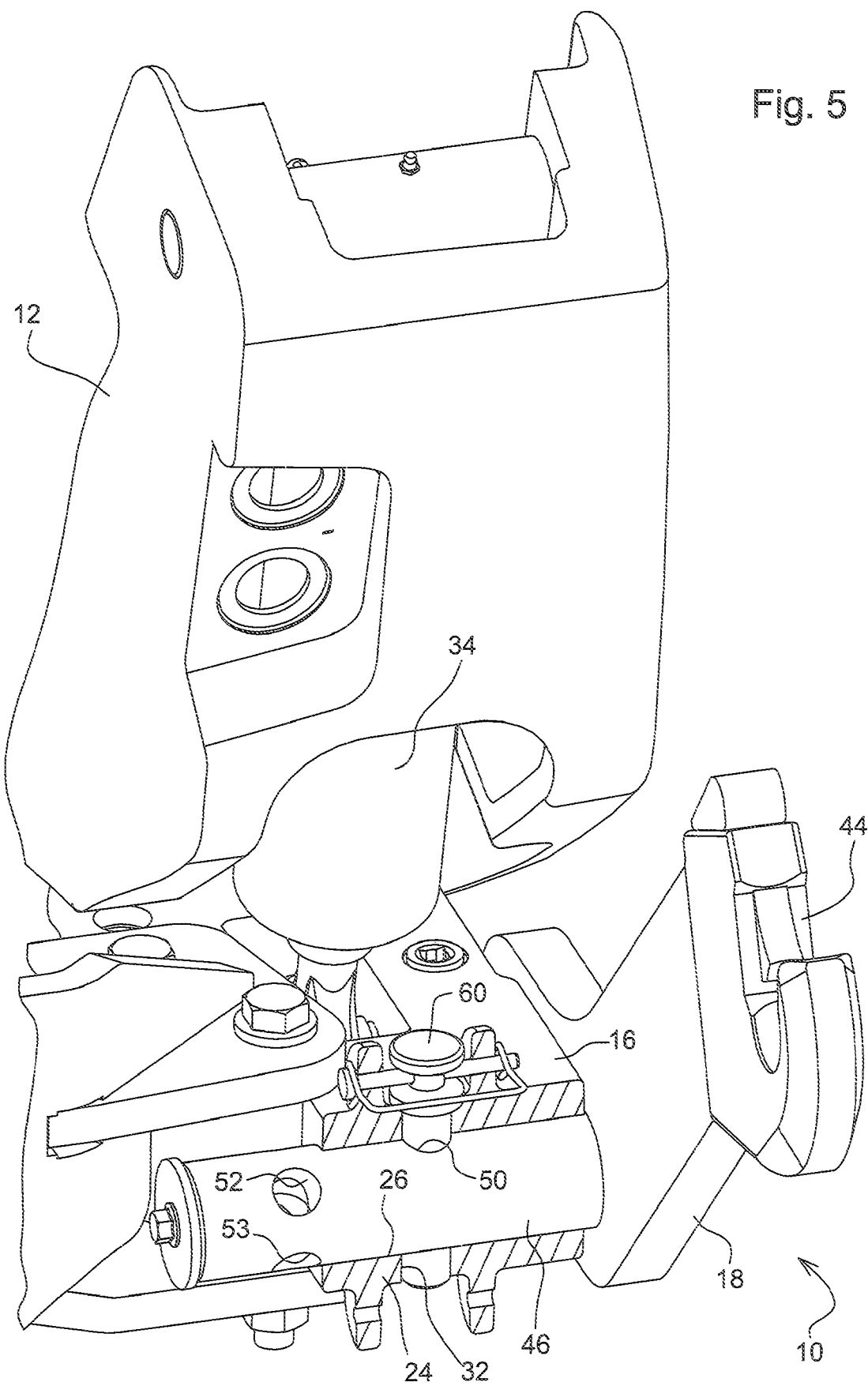
FIG. 5 is a perspective partially sectional view of the left side of the hitch assembly Of FIG. 1 showing the lift arm assembly in its working position.
Figure 6:
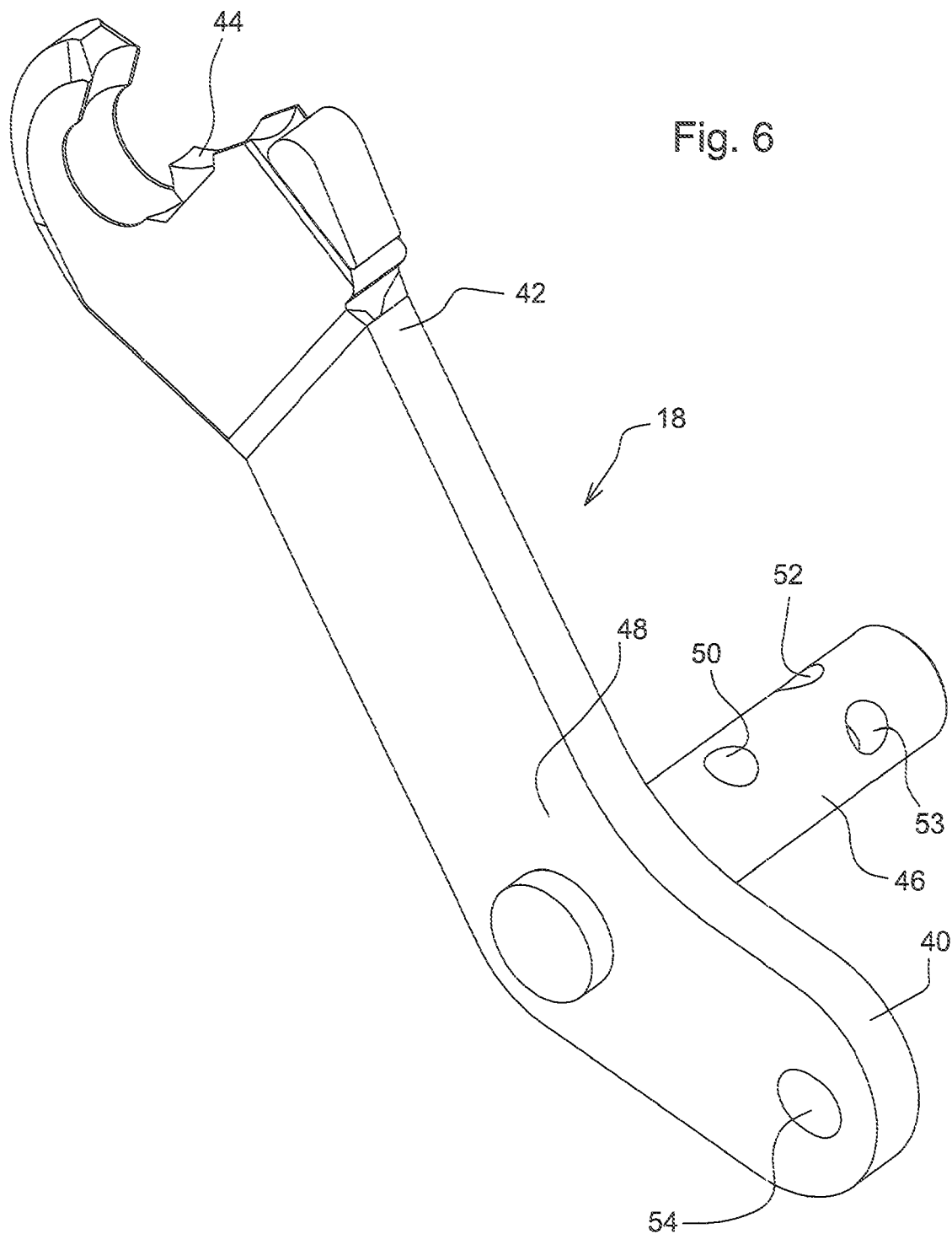
FIG. 6 is a perspective view of the second lift arm of the left lift arm assembly.

As best seen in FIGS. 4-6, the second arm 18 has a first end 40 and a second end 42 on which is mounted a coupler 44 adapted for coupling to an implement (not shown). A pivot pin 46 is fixed to and projects laterally from a mid portion 48 of the second arm 18. The pivot pin 46 is rotatably and slidably received by the pivot bore 26. A cross bore 50 extends through a mid portion of the pivot pin 46. A pair of intersecting cross bores 52 and 53 extend at different angles through the pivot pin 46 near the end thereof. Preferably, bores 52 and 53 intersect at 90 degrees to each other to allow the same pin to be used to make both the left hand and right hand arm assemblies/weldments. Only a single bore would be needed for the storage position, but having the 2 intersecting improves manufacturing convenience and reduces part count.

The first end 40 of the second arm 18 has a load bore 54 formed therein for slidably and releasably receiving the load pin 30. As best seen in FIG. 4, a retainer pin 60 is removably insertable though the cross bore 32 and though cross bore 52 to hold the second lift arm 18 in its outboard folded position. As best seen in FIG. 5, the retainer pin 60 is removably insertable though the cross bore 32 and though cross bore 50 to hold the second lift arm 18 in its inboard working position. The retainer pin 60 is removably insertable though the cross bore 32 and though cross bore 53 to hold the second lift arm 18 in an outboard unfolded position.

A retaining washer 62 is attached to the end of the pin 46 with a cap screw 64. The outside diameter of the washer 62 is larger than the bore 26 so that, when the operator slides the arm 18 outboard when placing it in the folded position, it won't travel too far outboard and become disengaged from the arm 16. This stop function can also help with aligning pin 60 with bore 50 so that the operator only has to worry about rotating the arm 18 to align bore 50 with the pin 60.

Thus, the second arm 18 is slidable with respect to the first arm 16 from an inboard working or loaded position wherein the load pin 30 is received by the load bore 54, to an outboard position wherein the load pin 30 is removed from the load bore 54. The retainer pin 60 is removably insertable though the cross bore 32 and though cross bores 50 to releasably hold the second arm 18 in its working position. When the second arm 18 is in its outboard position, the second arm 18 is pivotal with respect to the first arm 16 about the axis of the pivot pin 46 from a lowered position to a raised or folded position. The retainer pin 60 is removably insertable though the cross bore 32 and cross bore 52 to releasably hold the second arm 18 in its outboard folded position.

With this design, the arms 18 can be folded for storage despite a wide hitch frame that prevents more traditional folding arrangements. Also, this design has an advantage in that when folded, the ends of the lift arms 18 are too far apart to be attached to an implement—they are too wide. This prevent accidentally attaching an implement with the arms in the storage position, which can cause damage to the hitch, implement, or tractor.

While the present invention has been described in conjunction with a specific embodiment, it is understood that many alternatives, modifications and variations will be apparent to those skilled in the art in light of the foregoing description. For example, the hitch could be mounted to either the front or rear of a tractor. Accordingly, this invention is intended to embrace all such alternatives, modifications and variations which fall within the spirit and scope of the appended claims.

I claim:

1. A lift arm assembly for a hitch having a hitch frame adapted to be mounted to a vehicle, the lift arm assembly comprising:
   a first arm having a first end pivotally coupled to the frame, and having a second end, the second end of the first arm having a pivot bore extending thereinto, and a mid portion of the first arm having a load pin projecting therefrom;
   a second arm having a first end and having a second end adapted for coupling to an implement, a mid portion of the second arm having a pivot pin projecting therefrom, the pivot pin being rotatably and slidably received by the pivot bore, the first end of the second arm having a load bore formed therein for slidably receiving the load pin;
   the second arm is slidable with respect to the first arm from an inboard position wherein the load pin is received by the load bore to an outboard position wherein the load pin is removed from the load bore;
   the first arm has a retainer bore which intersects with the pivot bore, and a retainer member is slidably received in the retainer bore; and
   first and second cross bores are formed in the pivot pin, the retainer member being receivable by the first cross bore to releasably hold the second arm in its inboard position, and the retainer member being receivable by the second cross bore to releasably hold the second arm in its outboard position.

2. The lift arm assembly of claim 1, wherein:
   when the second arm is in its outboard position, the second arm is pivotal with respect to the first arm about an axis of the pivot pin from a lowered position to a raised position.

3. The lift arm assembly of claim 1, wherein:
   the second arm is pivotal with respect to the first arm about an axis of the pivot pin from a lowered position to a raised position.

4. The lift arm assembly of claim 1, wherein:
   the hitch is a front hitch.

5. A lift arm assembly for a hitch having a hitch frame adapted to be mounted to a vehicle, the lift arm assembly comprising:
   a first arm having a first end pivotally coupled to the frame, and having a second end, the second end of the first arm having a pivot bore extending thereinto, and a mid portion of the first arm having a load pin projecting therefrom;
   a second arm having a first end and having a second end adapted for coupling to an implement, a mid portion of the second arm having a pivot pin projecting therefrom, the pivot pin being rotatably and slidably received by the pivot bore, the first end of the second arm having a load bore formed therein for slidably receiving the load pin;
   the second arm is slidable with respect to the first arm from an inboard position wherein the load pin is received by the load bore to an outboard position wherein the load pin is removed from the load bore;
   when the second arm is in its outboard position, the second arm is pivotal with respect to the first arm about an axis of the pivot pin from a lowered position to a raised position;
   the first arm having a retainer bore which intersects with the pivot bore, and a retainer member is slidably received in the retainer bore; and first and second cross bores are formed in the pivot pin, the retainer member being receivable by the first cross bore to releasably hold the second arm in its inboard position, and the retainer member being receivable by the second cross bore to releasably hold the second arm in its outboard raised position.

6. A lift arm assembly for a hitch having a hitch frame adapted to be mounted to a vehicle, the lift arm assembly comprising:

a first arm having a first end pivotally coupled to the frame, and having a second end; and a second arm having a first end and having a second end adapted for coupling to an implement, the first end of the second arm being pivotally and slidably coupled to the second end of the first arm, the second arm being slidable with respect to the first arm from an inboard position to an outboard position, and when the second arm is in its outboard position, the second arm being pivotal with respect to the first arm from a lowered position to a raised position;

the second end of the first arm has a pivot bore extending thereinto;

the second arm having a pivot pin projecting therefrom, the pivot pin being rotatably and slidably received by the pivot bore;

the first arm has a load pin projecting therefrom;

the second arm having a load bore formed therein for slidably receiving the load pin;

the second arm is slidable with respect to the first arm from an inboard position wherein the load pin is received by the load bore to an outboard position wherein the load pin is removed from the load bore;

the first arm has a retainer bore which intersects with the pivot bore, and a retainer member is slidably received in the retainer bore; and first and second cross bores are formed in the pivot pin, the retainer member being receivable by the first cross bore to releasably hold the second arm in its inboard position, and the retainer member being receivable by the second cross bore to releasably hold the second arm in its outboard position.

7. The lift arm assembly of claim 6, wherein:

the second arm is pivotal with respect to the first arm about an axis of the pivot pin from the lowered position to the raised position.

\* \* \* \* \*